United States Patent Office 3,850,841
Patented Nov. 26, 1974

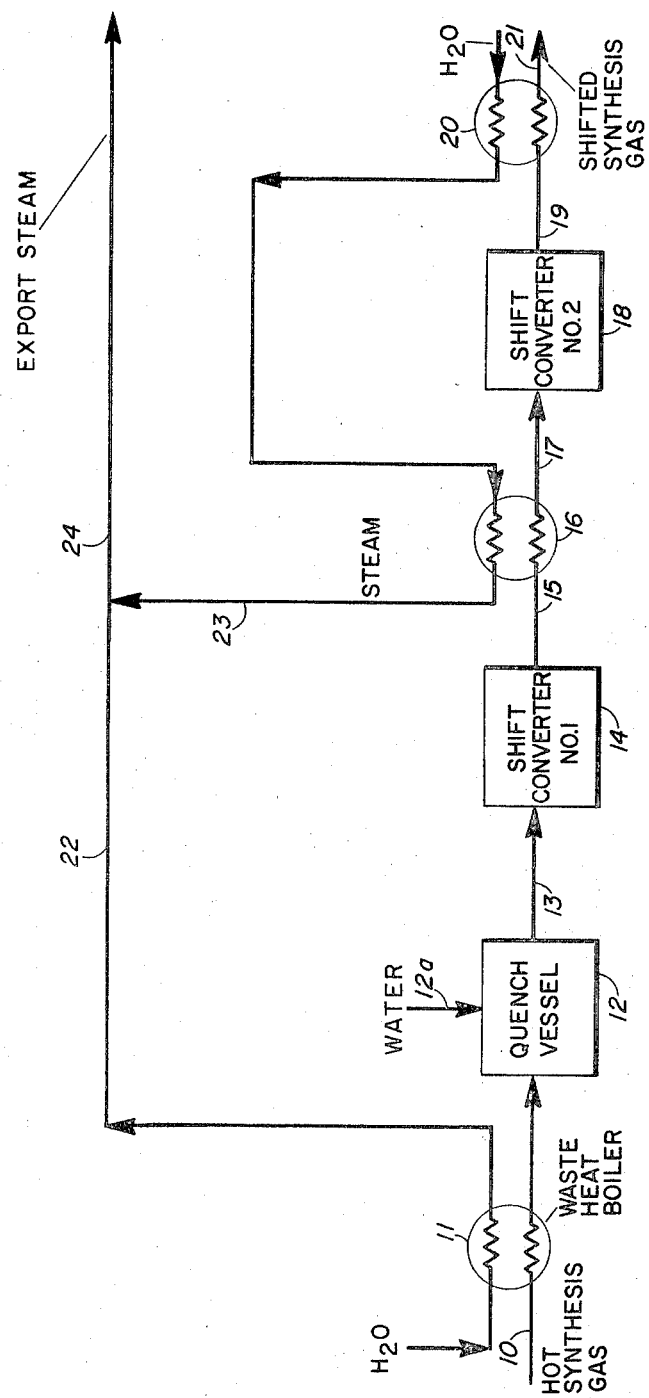

3,850,841
SHIFT PROCESS FOR NEW CATALYST
Clyde L. Aldridge, Baton Rouge, La., and Theodore Kalina, Morris Plains, N.J., assignors to Exxon Research and Engineering Company
Continuation-in-part of abandoned application Ser. No. 875,244, Nov. 10, 1969. This application Feb. 11, 1972, Ser. No. 225,633
The term of this patent subsequent to Nov. 24, 1991, has been disclaimed
Int. Cl. C01b 1/03, 2/06, 3/04
U.S. Cl. 252—373                                    22 Claims

ABSTRACT OF THE DISCLOSURE

A multiple stage process for preparing hydrogen from carbon monoxide and steam. A carbon monoxide containing synthesis gas is reacted with steam to produce hydrogen and carbon dioxide in a plurality of stages, using a catalyst comprising (1) an alkali metal compound derived from an acid having an ionization constant less than about $1\times10^{-3}$ and (2) a hydrogenation-dehydrogenation component in each stage. The synthesis gas is cooled to about 300° to 700° F. prior to entry into the first stage and after leaving the first stage. Steam requirements are substantially lower than the prior art process.

CROSS-REFERENCE TO RELATED APPLICATION

This application is a continuation-in-part of Ser. No. 875,244, filed Nov. 10, 1969, and now abandoned.

BACKGROUND OF THE INVENTION

This invention relates to a process for producing hydrogen by reacting carbon monoxide with steam in the presence of a catalyst at elevated temperatures.

Hydrogen is generally prepared in a two-step process in accordance with the following equations:

$$C+H_2O \rightleftharpoons CO+H_2$$
$$CO+H_2O \rightleftharpoons CO_2+H_2$$

In the first step, steam is reacted with a light hydrocarbon at about 1200° to 1600° F., or with a heavy hydrocarbon, coal or coke at temperatures up to about 2500° F., with or without injection of oxygen or air. The resulting synthesis gas mixture, which contains carbon monoxide and hydrogen, is reacted in the second step with more steam at lower temperatures in the presence of a suitable catalyst. The second step, known as the water gas shift reaction, is limited by equilibrium considerations and complete conversion of CO to $CO_2$ is not realized. Moreover, the concentration of CO in the product at equilibrium is highly dependent upon the temperature, lower temperatures shifting the reaction to the right with increased production of hydrogen. Consequently, conversions can be increased by either removing the carbon dioxide and again contacting the CO and steam with the catalyst in the same or subsequent stages, or by lowering the temperature.

The effect of temperature on the equilibrium constant $$K = \frac{(CO_2)(H_2)}{(CO)(H_2O)}$$

is shown in the following table.

TABLE I

| °F. | K | Concentration of CO at equilibrium (dry basis) feed | |
|---|---|---|---|
| | | A[1] | B[1] |
| 900 | 5.61 | 7.5 | 2.9 |
| 800 | 9.03 | 5.3 | 1.9 |
| 700 | 15.89 | 3.4 | 1.1 |
| 600 | 31.44 | 1.9 | 0.6 |
| 500 | 72.75 | 0.9 | 0.2 |
| 400 | 206.80 | 0.3 | 0.1 |

[1] A—50% of a 1/1 $H_2/CO$ mixture +50% $H_2O$ (steam). B—30% of a 1/1 $H_2/CO$ mixture+70% $H_2O$ (steam).

It is thus evident that less CO will remain unconverted and costly methods of operation will be avoided by operating at as low temperatures as possible, e.g., 200° to 700° F., preferably 400° to 600° F. Such low temperatures can be employed by the use of a catalyst consisting of copper deposited on zinc oxide. Unfortunately, however, this catalyst will not tolerate even traces of sulfur in the feed. Since coal and coke and heavy hydrocarbon feeds suitable for conversion to hydrogen contain appreciable amounts of sulfur, e.g., up to 5 to 10 weight percent, which is converted to hydrogen sulfide and even some small amounts of carbon disulfide and carbonyl sulfide, these feeds are precluded from use with the Cu-ZnO catalyst, and are limited to shift temperatures of about 650° to 950° F. using a sulfur resistant catalyst such as $Fe_2O_3$ promoted with $Cr_2O_3$.

In the copending application of Clyde L. Aldridge, Ser. No. 152,584, filed June 14, 1971, which is a continuation-in-part of Ser. No. 821,452, filed May 2, 1969, the disclosures of said applications being incorporated herein by reference, it is shown that a catalyst comprising (1) at least one alkali metal compound derived from an acid having an ionization constant less than about $1\times10^{-3}$ and (2) a hydrogenation-dehydrogenation component consisting of at least one element selected from the group consisting of Groups V–B, VI–B and VIII of the Periodic Table of the Elements, the ratio of the hydrogenation-dehydrogenation component to the alkali metal compound, each calculated on the basis of the oxide thereof, being 0.001 to 10 parts by weight of the alkali metal compound, is a highly effective catalyst at temperatures of 300° to 700° F., and is not poisoned by the presence of sulfur in the feed.

Shift catalysts containing metallic hydrogenation-dehydrogenation components in combination with minor amounts of alkali metal materials have been described in British Patent 961,860 and U.S. Pat. 3,529,935. Numerous other references exist that disclose catalyst combinations composed of heavy metal constituents with alkali compounds. Exemplary of such teachings are the disclosures of Switzerland Patent 69,336; U.S. 1,330,772; U.S. 3,568,-208; U.S. 3,490,872; U.S. 1,896,840; U.S. 2,147,780; U.S. 2,364,562; Ztschr. Elektrochem. *44* (1938), pp. 577–578; Netherlands application 66 01536; Japanese Patent 129,-729; Russian Patent 67,942; French Patents 777,546 and 815,351; Austrian Patents 149,657 and 153,165; German Patent 706,868; Belgian Patent 659,421 and Simck et al., Zprary Ustova Ved. Vyk. Uhli Praze, 2 (1935), pp. 113–128 (see also Chem. Abs., *30* (1936)).

SUMMARY OF THE INVENTION

It has now been found that a synthesis gas mixture containing carbon monoxide and steam and contaminated with relatively large amounts of sulfur can be efficiently converted to a gas mixture rich in hydrogen in a multiple stage process which comprises cooling the synthesis gas mixture to about 300° to about 700° F., contacting the gas mixture with a catalyst in a first stage, again cooling the gas mixture to about 300° to about 700° F., contacting the gas mixture in at least one additional stage with a catalyst, and withdrawing a gas rich in hydrogen from the last stage. The catalyst in each stage is (1) an alkali metal compound derived from an acid having an ionization constant less than about $1\times10^{-3}$ and (2) a hydrogenation-dehydrogenation component consisting of at least one element of Group V–B, VI–B or VIII of the Periodic Table of the Elements. In a preferred embodiment, this process is carried out in two stages.

DESCRIPTION OF THE PREFERRED EMBODIMENT

This invention will now be described with reference to the accompanying figure which is a flow diagram of the preferred process embodiment.

Referring to the drawing, a hot synthesis gas stream 10 is passed through a waste heat boiler 11 in indirect heat exchange with water, which is converted to steam, and is then further cooled with water in quench vessel 12 to a temperature in the range of about 300° to about 700° F., preferably about 450° F., whereby additional steam is generated. Water is added to quench vessel 12 through inlet 12a. The synthesis gas mixture containing carbon monoxide and steam is then passed from quench vessel 12 through line 13 into the first stage shift converter 14 at a temperature between about 300° to about 700° F. The catalyst in shift converter 14 is a catalyst comprising an alkali metal compound and a hydrogenation-dehydrogenation component, as will be hereinafter described in detail.

The water gas shift reaction is highly exothermic, so that a substantial temperature rise occurs in the first stage shift converter 14. Typically, this temperature may rise from about 450° to about 840° F. At least a portion of the effluent from the first stage shift converter 14 is passed through line 15 and waste heat boiler 16, where it is again cooled by indirect heat exchange with water, which is converted to steam, thence through line 17 into the second stage shift converter 18. The catalyst in the second stage converter 18 is similar to that in the first stage converter 14. The temperature rise in the second stage shift converter is relatively small, e.g., on the order of about 10° to 200° F. Typically the temperature rise in the second stage may be from about 450° to about 540° F. The effluent from the second stage passes through line 19 and waste heat boiler 20 into exit line 21. The product in exit line 21 is a shifted synthesis gas which is rich in hydrogen and poor in carbon monoxide. The steam, carbon dioxide and hydrogen sulfide in the gaseous product may be removed by conventional procedures. Steam from the waste heat boilers 11, 16 and 20 is withdrawn through a pair of lines 22 and 23 which merge to form a single export steam line 24.

A significant advantage of the process of the present invention is the low steam requirement. For example, the entering synthesis gas in line 13 will generally contain about 25 to about 200 moles, preferably about 50 to 150 moles, of steam per 100 moles of dry feed. A typical steam content is about 100 moles per 100 moles of dry feed. This is in contrast to conventional procedures, where frequently the steam content is more than 200 moles per 100 moles of dry feed.

A further advantage of the present invention is that operations can be carried out at low temperatures without sulfur poisoning. Low temperature operation is highly desirable because of the favorable equilibrum. Yet, such operations were impossible in the presence of sulfur prior to the development of the catalyst described herein.

The present invention makes it possible to achieve substantially complete conversion of carbon monoxide to carbon dioxide without intermediate $CO_2$ removal at low temperatures, an accomplishment which has heretofore been impossible in the presence of sulfur. These results are obtained in accordance with the present invention by carrying out the reaction in the presence of a catalyst which comprises (1) an alkali metal compound derived from an acid having an ionization constant less than about $1 \times 10^{-3}$, and (2) 0.001 to 10 parts by weight (oxide basis) of a hydrogenation-dehydrogenation component consisting of at least one element selected from the group consisting of the elements of Groups V–B, VI–B and VIII of the Periodic Table of the Elements per weight of alkali metal compound (oxide basis), without reference to any support which may be used. The use of a hydrogenation-dehydrogenation component in conjunction with the alkali metal salt enables more complete conversion of the carbon monoxide to carbon dioxide even in the presence of sulfur and thus affords vast economic savings since a costly intermediate step of removing the carbon dioxide is avoided. While it is not intended to be limited by any theory concerning the mechanism of the reaction, it is believed that the alkali metal component in the presence of water vapor exists as a liquid phase in contact with the surface of the hydrogenation-dehydrogenation component. It is believed that the aqueous alkali metal phase converts the carbon monoxide to formate and the hydrogenation-dehydrogenation catalyst surface converts the formate into $CO_2$ and $H_2$. Thus, the interaction between the two types of catalytic materials brings about a vast synergistic effect on catalytic activity.

Suitable alkali metal components include the carbonate, bicarbonate, biphosphate, sulfide, hydrosulfide, silicate, bisulfite, aluminate, hydroxide, tungstate, etc., of sodium, potassium, lithium, rubidium and cesium. In addition, the alkali metal salts of organic acids such as acetic acid, propionic acid, etc., are equally suitable. Actually, the alkali salt of any acid which has an ionization constant of less than about $1 \times 10^{-3}$ may be used. The potassium and cesium salts are most preferred.

It has been discovered that at least a portion of the weak acid alkali metal salts are converted to the corresponding alkali metal carbonate during the course of the shift reaction. Additionally, salts of relatively unstable strong acids, such as nitric acid, are also converted, at least partially, to the carbonate. Hence, in most instances, the ultimate catalyst specie is believed to be the alkali metal carbonate. Therefore, the alkali metal catalyst constituent may be any material that is at least partially converted to the alkali carbonate during the course of the shift reaction.

The hydrogenation-dehydrogenation component of the catalyst comprises one or more metal materials, preferably sulfided non-noble metals of Groups V–B, VI–B and VIII of the Periodic Table (designed by Henry D. Hubbard and revised 1956 by William F. Meggers of the National Bureau of Standards). Vanadium, molybdenum, tungsten, cobalt, tantalum and niobium (columbium) materials may be used alone or in admixture with each other in any proportion. Additionally, vanadium, molybdenum, tungsten, cobalt, niobium and tantalum or mixtures thereof in combination with nickel, iron or chromium materials or their mixtures are also effective catalyst components. When nickel, iron or chromium containing mixtures are employed, the nickel, iron and/or chromium constituent should not make up more than about 80 mole percent, preferably less than about 50 mole percent, of the total hydrogenation-dehydrogenation components. Examples of useful hydrogenation-dehydrogenation metals include cobalt, molybdenum, cobalt-molybdenum, molybdenum-chromium, tungsten-chromium, cobalt-nickel, cobalt-iron, molybdenum-tungsten, vanadium-tungsten, vanadium-cobalt, nickel-tungsten, vanadium, vanadium-tantalum, cobalt-niobium, niobium-iron, cobalt-nickel-iron, cobalt-nickel-molybdenum, tungsten-iron-nickel, etc.

If the metals of Groups V–B, VI–B and VIII are used with sulfur-containing feeds, they may be used in the form of the oxide or other compound easily sulfided. These compounds are then sulfided in situ during the passage of a sulfur-containing feed ($H_2S$, organic sulfides, etc.) over them. The chemical form of the catalyst metal materials is not critical. Preferably the metal materials are in a form that can be at least partially reduced and/or sulfided under shift reaction conditions. Cesium or potassium carbonate or acetate combined with cobalt-molybdenum materials is a particularly effective catalyst. Hereinafter, the hydrogenation-dehydrogenation catalyst component will be referred to as the metal without reference to its precise chemical composition. Under the reaction conditions the catalyst usually exists in a partially reduced and sulfided state which is difficult to define stoichiometrically, and thus a description using the active metallic elements is as accurate as any.

The catalytically active metal components may be used either supported or unsupported, and in the former case the nature of the carrier is not critical. Suitable carriers include porous inorganic oxides, such as gamma- and alpha-alumina. Alpha-alumina is preferred because of its high thermal stability. Other suitable support materials include silica; silica-alumina, e.g., silica-alumina cogel cracking catalysts; zeolites such as faujasite, erionite and the like; activated carbon; coconut charcoal; Columbia L carbon; magnesia; titania; zirconia; silicon carbide and the like. Particularly suitable gamma- and alpha-alumina catalyst supports are available commercially. Such supports may be prepared by a variety of methods. For example, they may be prepared by hydrolyzing an aluminum alcoholate which may have been prepared in accordance with the disclosures of U.S. Pat. No. 2,636,865. They may also be prepared by precipitating a hydrous alumina from an aqueous solution of an aluminum salt, preferably $AlCl_3$. A third method of preparation comprises dissolving metallic aluminum in weekly acidified water, preferably acidified with an organic acid, such as acetic acid, in the presence of mercury or compound thereof, and thereafter gelling the alumina sol thus formed. The hydrous alumina prepared by any of the foregoing procedures is subsequently dried and calcined at temperatures between 600° and 1200° F., preferably between 900° and 1000° F.

The catalyst components can be incorporated on the support in any conventional manner. Preferably the hydrogenation-dehydrogenation components are placed on the support first and this combination is then calcined, e.g., at 1000° to 1200° F., to convert the metals to the stable oxide forms. Then the alkali metal, e.g., cesium or potassium carbonate, is impregnated onto the support and the catalyst simply dried. In general, the carrier material is impregnated with a solution containing the desired compound.

Alternatively, the various components may be mixed by mechanical means, such as by dry mixing. Good catalysts can be obtained by fine milling of a cobalt-molybdenum catalyst supported on alumina and mixing the powder obtained with a powdered alkali metal compound such as cesium carbonate. The resultant mixture, after the addition of a lubricant such as stearic acid or graphite, is compressed into pellets which can be calcined and sulfided.

The weight ratio of hydrogenation-dehydrogenation component to alkali metal compound present in the catalyst is critical to the ultimate performance of the catalyst. Maximum catalyst activity is encountered when the ratio of metal component to alkali metal compound is less than 10:1, preferably less than about 5:1, and most preferably less than about 3:1, the weight ratios being calculated on the basis of the oxides of each constituent. Typically, from about 0.001 to about 5-10 parts by weight of hydrogenation-dehydrogenation component is used per part by weight of alkali metal compound. For purposes of calculating weight ratios, the metals are assumed to exist in only the following oxide forms: $CoO$, $MoO_3$, $WO_3$, $V_2O_5$, $Fe_2O_3$, $NiO$, $Cr_2O_3$, $Ta_2O_5$ and $Cb_2O_5$.

When a carrier is used, it may constitute any desired amount of the total catalyst composition, e.g., from 0 up to about 99.5% of the combined weight of alkali metal compound, hydrogenation-dehydrogenation component, and carrier. The amount of hydrogenation-dehydrogenation component used in the catalyst is not critical. Typically, a supported catalyst will be composed of about 0.1 to 35 weight percent, preferably 5 to 20 weight percent, of the hydrogenation-dehydrogenation component measured on the basis of the oxide thereof.

Shift catalysts which have been found particularly effective consist of an alkali material, a cobalt material, a molybdenum material supported on gamma-alumina. Particularly suitable catalysts contain from about 0.1 to about 10% by weight, preferably 1 to 5 weight percent cobalt (oxide basis) and from about 1 to about 25% by weight, preferably 5 to 15 weight percent molybdenum (oxide basis) based on the combined weights of the cobalt material, molybdenum material, alkali constituent and carrier.

The low temperature catalyst system is particularly effective when at least a portion of the hydrogenation-dehydrogenation component and/or alkali metal component is present in a sulfide form. The catalyst metals may be sulfided after catalyst formation and prior to contact with the steam and carbon monoxide. Alternatively, the catalyst metals may be sulfided, in situ, through contact with sulfur bearing constituents present in the process feedstock. It should be recognized that the low temperature shift catalyst used herein can be employed with advantage when the catalyst metals are not present in a sulfide form. Generally, however, the conversion of any part of the catalyst metals to a sulfide form will have a beneficial effect on catalyst activity.

A preferred laboratory catalyst metal sulfiding procedure involves contacting a 10 cubic centimeter volume of catalyst with a feed gas mixture composed of approximately 52 volume percent carbon monoxide, 47 volume percent hydrogen and about 1 volume percent hydrogen sulfide. The feed gas mixture is passed through the reactor containing the catalyst at a rate such as to maintain an exit dry gas product rate of 2700 volumes per volume of catalyst per hour as measured at room temperature and atmospheric pressure (standard conditions). This feed gas mixture is initially passed over the catalyst at the above rate for about 110 minutes at 250° F. and at atmospheric pressure. Thereafter, the catalyst bed is gradually heated from 250° F. to 625° F. over a period of about 135 minutes. During this period, the catalyst is continuously contacted with the feed gas mixture at the rate indicated at atmospheric pressure. The 625° F. temperature level is then maintained for an aditional 130 minutes while continuing the contacting of the catalyst with the gas mixture at atmospheric pressure. Thereafter, the reaction zone pressure is raised to 75 lbs. per square inch (p.s.i.g.) and the feed gas introduced into the system at 625° F. for 30 minutes at a gas rate of about 4200 volumes of feed gas at standard conditions per volume of catalyst per hour. The reactor is then pressurized to 550 p.s.i.g. and the feed gas introduced in the previously described rate for an additional 60 minutes. Finally, steam is admixed with the feed gas at a rate of about one mole of steam per mole of dry product gas and the temperature of the system maintained at 550 p.s.i.g. and 625° F.

The process is preferably carried out continuously. The gaseous hourly space velocity can vary within wide limits. Gaseous hourly space velocities between 300 and 30,000 volumes of feed per volume of supported catalyst per hour (v./v./hr.) measured on the basis of dry gas under standard conditions are particularly suitable for most applications. The process may be carried out at higher gaseous hourly space velocities if desired.

Water gas shift reactions are well known. A gaseous feed mixture containing carbon monoxide and steam in an amount of about 0.5 to 100, preferably 1.5 to 25 volumes per volume of carbon monoxide, is introduced into a shift converter and passed over the alkali metal and hydrogenation-dehydrogenation catalyst at an inlet temperature between 300° and 700° F. The pressure is preferably in the range of 200 to 1500 pounds per square inch gauge (p.s.i.g.), although it may vary from atmospheric to 3,000 p.s.i.g. or more. However, the exact pressure and temperature conditions must be maintained above the dew point of the steam in the mixture. The temperature and pressure of the reaction mixture in contact with the catalyst are maintained such that the reaction temperature is above the dew point temperature of the mixture and the reaction zone pressure is below the reaction mixture dew point pressure. The process is particularly effective when the feed contains minor amounts of a sulfur material ($H_2S$, organic sulfides, etc.). In fact, the presence of small amount (0.01 to 200 v.p.p.m.) of sulfur in the feed actually results in increased conversions in many cases. If necessary the catalyst may be regenerated by oxidation and resulfiding.

Typical results of operations in accordance with the process of this invention are given in the following example.

Example

A gas mixture containing about 44% hydrogen, about 49% carbon monoxide, and about 1% $H_2S$ on the dry basis may be used as the feed. This gas mixture may be passed sequentially through a waste heat boiler 11, quench vessel 12, first stage shift converter 14, waste heat boiler 16, second stage shift converter 18, and waste heat boiler 20, and withdrawn through line 21 as shown in the accompanying drawing.

A preferred catalyst in shift converter 14 and 18 consists of 13.8% by weight $K_2CO_3$, 3.0% by weight CoO, 10.8% by weight $MoO_3$, and 72.4% by weight of a gamma-alumina carrier having a surface area of about 250 square meters per gram. An alternative catalyst composition consists of 10.0% by weight $K_2CO_3$, 1.4% by weight CoO, 6.2% by weight $MoO_3$, and 82.4% by weight of alpha-alumina having a surface area of about 5 square meters per gram. Cesium carbonate can be substituted mole for mole in place of potassium carbonate with generally better results, but the cesium catalyst is more expensive.

Illustrative temperatures and gas compositions, the latter being on the basis of 100 moles of dry feed, are shown in Table II below.

TABLE II

| | Location [1] | | | |
|---|---|---|---|---|
| | 13 | 15 | 17 | 19 |
| $H_2$ | 44.2 | 81.6 | 81.6 | 90.2 |
| CO | 48.7 | 11.3 | 11.3 | 2.7 |
| $CO_2$ | 5.2 | 42.6 | 42.6 | 51.2 |
| $N_2+CH_4+H_2S$ | 1.9 | 1.9 | 1.9 | 1.9 |
| $H_2O$ | 98.4 | 61.0 | 61.0 | 52.4 |
| Total | 198.4 | 198.4 | 198.4 | 198.4 |
| Temp., °F | 450 | 840 | 450 | 540 |

[1] Refers to reference numerals in drawing.

The catalyst in both the first stage shift converter 14 and the second stage shift converter 18 may consist of cobalt-molybdenum dispersed on gamma-alumina having a surface area of about 200 to 400 square meters per gram and a pore volume of 0.60 to 0.70 cc. per gram, the cobalt content corresponding to 3.5 weight percent of cobalt oxide and the molybdenum content corresponding to 13 weight percent molybdenum trioxide, impregnated with 44 to 48 weight percent of cesium acetate in an aqueous solution ($1.7 \times 10^{-3}$ moles per cc. of catalyst volume), dried at about 150° C., and sulfided in situ by passing the feed over the catalyst for about an hour at a temperature of 625° F.

What is claimed is:

1. A process for the preparation of hydrogen and carbon dioxide which comprises introducing a gas mixture containing monoxide and steam at a temperature varying from about 300° to 700° F. into a first shift reaction stage and contacting said gas mixture therein with a catalyst to form a reaction mixture, cooling at least a portion of said reaction mixture from said first stage to a temperature of about 300° to about 700° F. and introducing at least a portion of said cooled reaction mixture to at least one additional shift reaction stage and contacting the same therein with a catalyst, the temperature within each said reaction stage being maintained above the dew point temperature of the reaction mixture and the pressure within each said reaction stage being maintained below the dew point pressure of said reaction mixture and ranging from about atmospheric to about 3,000 p.s.i.g., the catalyst in each reaction stage comprising (i) an alkali metal compound derived from an acid having an ionization constant of less than about $1 \times 10^{-3}$ and (ii) a hydrogenation-dehydrogenation component selected from the group consisting of (a) a metal composition comprising vanadium, molybdenum, tungsten, cobalt, tantalum or niobium materials or mixtures thereof or (b) mixtures of materials comprising vanadium, molybdenum, tungsten, cobalt, tantalum or niobium materials or mixtures thereof with a nickel, iron or chromium material or mixtures thereof, the weight ratio of said hydrogenation-dehydrogenation component to said alkali metal compound, each calculated on the basis of the oxides thereof, being less than 5:1.

2. The process of claim 1 wherein said gas mixture additionally contains minor amounts of a sulfur material.

3. The process of claim 1 wherein said alkali metal compound is an alkali metal carbonate.

4. The process of claim 1 wherein said hydrogenation-dehydrogenation component is a mixture of cobalt and molybdenum materials.

5. The process of claim 1 wherein at least a portion of said alkali metal compound or hydrogenation-dehydrogenation component is in a sulfide form.

6. A process for the preparation of hydrogen and carbon dioxide which comprises introducing a gas mixture containing carbon monoxide and steam at a temperature varying from about 300° to 700° F. into a first shift reaction stage and contacting said gas mixture therein with a catalyst to form a reaction mixture, cooling at least a portion of said reaction mixture from said first stage to a temperature of about 300° to about 700° F. and introducing at least a portion of said cooled reaction mixture to at least one additional shift reaction stage and contacting the same therein with a catalyst, the temperature within each said reaction stage being maintained above the dew point temperature of the reaction mixture and the pressure within each said reaction stage being maintained below the dew point pressure of said reaction mixture and ranging from about atmospheric to about 3000 p.s.i.g., the catalyst in each reaction stage comprising (i) an alkali metal compound derived from an acid having an ionization constant of less than about $1 \times 10^{-3}$ and (ii) a hydrogenation-dehydrogenation component comprising (a) vanadium, molybdenum, tungsten or cobalt materials or mixtures thereof or (b) mixtures of vanadium, molybdenum, tungsten or cobalt materials or mixtures thereof with nickel, iron or chromium materials or mixtures thereof, said catalyst contained on a support and at least a portion of said alkali metal compound or hydrogenation-dehydrogenation component being in a sulfide form, the weight ratio of said hydrogenation-dehydrogenation component to said alkali metal compound, each calculated on the basis of the oxides thereof, being less than 5:1.

7. The process of claim 6 wherein said hydrogenation-dehydrogenation component is a mixture of cobalt and molybdenum materials.

8. The process of claim 6 wherein said gas mixture additionally contains minor amounts of a sulfur material.

9. The process of claim 6 wherein said catalyst comprises from about 1 to about 5 weight percent cobalt material, from about 5 to about 15 weight percent molybdenum material, each based on total catalyst, and potassium carbonate, said cobalt material, molybdenum material and potassium carbonate contained on an alumina support.

10. A process for the preparation of hydrogen and carbon dioxide by reaction of steam with a synthesis gas mixture comprising carbon monoxide and hydrogen which comprises cooling said synthesis gas to a temperature of about 300° to 700° F. by indirect heat exchange with water, contacting said cooled synthesis gas in admixture with steam with a catalyst in a first reaction stage to form a reaction mixture, cooling at least a portion of the reaction mixture from said first stage to 300° to 700° F. by indirect heat exchange with water, contacting at least a portion of said cooled reaction mixture with a catalyst in at least one additional reaction stage and withdrawing a final effluent gas rich in hydrogen from said reaction stage, the temperature within said reaction stages being maintained above the dew point temperature of the reaction mixture and the pressure within said reaction stages being maintained below the dew point pressure of the reaction mixture, the catalyst in each reaction stage comprising (i) an alkali metal compound derived from an acid having an ionization constant of less than about $1 \times 10^{-3}$ and (ii) a hydrogenation-dehydrogenation component comprising (a) vanadium, molybdenum, tungsten, or cobalt materials or mixtures thereof or (b) mixtures of vanadium, molybdenum, tungsten or cobalt materials or mixtures thereof with nickel, iron or chromium materials or mixtures thereof, said catalyst contained on a support and at least a portion of said alkali metal compound or hydrogenation-dehydrogenation component being in a sulfide form, the weight ratio of said hydrogenation-dehydrogenation component to said alkali metal compound, each calculated on the basis of the oxides thereof, being less than 5:1.

11. The process of claim 10 wherein said catalyst comprises from about 1 to about 5 weight percent cobalt material, from about 5 to about 15 weight percent molybdenum material, each based on total catalyst, and potassium carbonate, said cobalt material, molybdenum material and potassium carbonate contained on an alumina support.

12. The process of claim 1 wherein the weight ratio of said hydrogenation-dehydrogenation component to said alkali metal compound, each calculated on the basis of the oxides thereof, is less than about 3:1.

13. The process of claim 6 wherein said support is a porous inorganic oxide.

14. The process of claim 6 wherein said alkali metal compound is potassium carbonate or cesium carbonate.

15. The process of claim 9 wherein the weight ratio of said hydrogenation-dehydrogenation component to said alkali metal compound, each calculated on the basis of the oxides thereof, is less than about 3:1.

16. The process of claim 6 wherein the weight ratio of said hydrogenation-dehydrogenation component to said alkali metal compound, each calculated on the basis of the oxides thereof, is less than about 3:1.

17. The process of claim 10 wherein said alkali metal compound is potassium carbonate or cesium carbonate.

18. The process of claim 10 wherein said support is a porous inorganic oxide.

19. The process of claim 18 wherein the alkali metal compound is potassium carbonate or cesium carbonate.

20. The process of claim 10 wherein the weight ratio of said hydrogenation-dehydrogenation component to said alkali metal compound, each calculated on the basis of the oxides thereof, is less than about 3:1.

21. The process of claim 10 wherein said gas mixture additionally contains minor amounts of a sulfur material.

22. The process of claim 21 wherein the weight ratio of said hydrogenation-dehydrogenation component to said alkali metal compound, each calculated on the basis of the oxides thereof, is less than about 3:1.

References Cited

UNITED STATES PATENTS

| | | | |
|---|---|---|---|
| 3,367,882 | 2/1968 | Marshall, Jr. | 252—376 |
| 3,387,942 | 6/1968 | Habermehl et al. | 423—437 |
| 3,388,972 | 6/1968 | Reitmeier et al. | 423—652 |
| 3,392,001 | 7/1968 | Lorenz et al. | 423—656 |
| 3,441,393 | 4/1969 | Finneran et al. | 48—197 |
| 3,529,935 | 9/1970 | Lorenz et al. | 423—437 |
| 3,615,216 | 10/1971 | Aldridge | 423—655 |

FOREIGN PATENTS

| | | | |
|---|---|---|---|
| 940,960 | 11/1963 | Great Britain | 252—373 |
| 961,860 | 6/1964 | Great Britain | 23—213 |

EDWARD STERN, Primary Examiner

U.S. Cl. X.R.

252—439, 467, 470, 474, 476; 423—655

UNITED STATES PATENT OFFICE
CERTIFICATE OF CORRECTION

PATENT NO. : 3,850,841
DATED : November 26, 1974
INVENTOR(S) : Clyde L. Aldridge et al It is certified that error appears in the above-identified patent and that said Letters Patent are hereby corrected as shown below:

At column 7, line 61, following "containing", should be added the word --carbon--.

Signed and Sealed this nineteenth Day of August 1975

[SEAL]

Attest:

RUTH C. MASON
Attesting Officer

C. MARSHALL DANN
Commissioner of Patents and Trademarks